United States Patent [19]

Stoll et al.

[11] Patent Number: 5,777,471
[45] Date of Patent: Jul. 7, 1998

[54] DEVICE FOR DETECTING ANGULAR POSITIONS OF A SHAFT

[75] Inventors: Kurt Stoll, Esslingen; Michael Streck, Korb; Klaus Keinrad, Köngen, all of Germany

[73] Assignee: Festo KG, Esslinger, Germany

[21] Appl. No.: 763,930

[22] Filed: Dec. 12, 1996

[30] Foreign Application Priority Data

Dec. 12, 1995 [DE] Germany .................. 195 46 240.8

[51] Int. Cl.[6] .................................................. G01B 7/30
[52] U.S. Cl. .................................... 324/207.25; 324/174
[58] Field of Search ........................... 324/207.2, 207.21, 324/207.23, 207.25, 207.26, 260, 261, 262, 166, 167, 168, 173, 174; 310/152–156, 168; 340/669–672, 686; 336/30, 45, 110; 73/518–520

[56] References Cited

U.S. PATENT DOCUMENTS 4,626,781  12/1986  Forkel ..................... 324/174

FOREIGN PATENT DOCUMENTS

3411773 A1  5/1985  Germany .
3941255 C2  6/1991  Germany .

Primary Examiner—Sandra L. O'Shea
Assistant Examiner—Jay M. Patidar
Attorney, Agent, or Firm—Hoffman & Baron, LLP

[57] ABSTRACT

A device for detection of angular positions of a shaft adapted to be rotated about its longitudinal axis. An actuating member keyed on the shaft moves along an arcuate path during rotation of the shaft. At least one sensor is adjustably secured by means of a holding means on an arcuate guide of a sensor carrier so that it may be positioned along the path of movement of the actuating member. In order to render possible accurate resetting, on the sensor carrier teeth are provided on the sensor carrier following the curvature of the arcuate guide, such teeth being engaged by a setting gear wheel rotatably mounted on the holding means. On turning the setting gear wheel the holding means connected with the sensor is shifted along the arcuate guide 20 Claims, 4 Drawing Sheets

DEVICE FOR DETECTING ANGULAR POSITIONS OF A SHAFT

BACKGROUND OF THE INVENTION

The invention relates to a device for detecting angular positions of a shaft able to be driven about its longitudinal axis, comprising an actuating member connected with the shaft, in such a manner as to prevent relative rotation, at a radial distance from said longitudinal axis and at least one sensor for responding to the actuating member, said sensor being arranged by means of a holding member in such a longitudinally adjustable fashion on a more especially circularly arcuate guide forming part of a sensor carrier which is stationary in relation to the shaft when rotating that the sensor may be positioned in different working positions along the arcuate track of movement defined by the actuating member.

PREVIOUS PROPOSALS

Such a device, known to the applicant, has been based on a rotary drive as described in the German patent publication 3,941,255 C2. This rotary drive comprises a shaft able to be oscillated about its axis by fluid power and on which a radially projecting abutment arm is arranged for cooperating with counter-abutments provided on a housing for presetting a desired angle of rotation. The counter-abutments may be moved in an arcuate guide in the longitudinal direction of the arc. On each counter-abutment a sensor, as for example an inductive sensor, may be set which on reaching the maximum angular position responds to an actuating portion constituted by the abutment arm. On resetting the positions of the counter-abutments the sensors will also be automatically reset as well.

Accordingly the counter-abutments constitute holding means for the sensors. In order to change the working position of a sensor a clamp connection between the holding portion and the housing serving as a sensor carrier is released for the holding portion to be shifted and lastly the clamp connection is set again.

In this case the setting mechanism basically serves for setting the terminal angular positions of the shaft, the working positions of the sensors being automatically reset as well, whose position relative to the respective counter-abutment always remains the same. For setting in this manner, the degree of accuracy with which the settings may be produced, is quite sufficient.

There is presently a demand for the detection of angular settings independently of the maximum possible terminal angular settings. The monitoring or detection of intermediate positions is particularly advantageous in those cases in which, in a manner dependent on certain angular positions, some further control operations are to be initiated. For such settings as are to be made extremely accurately, this known setting mechanism is less suitable, seeing that it is relatively difficult to very exactly set to the desired working position along the arcuate guide.

SHORT SUMMARY OF THE INVENTION

One object of the invention is to provide a device of the sort noted initially which in a simple fashion renders possible an extremely exact setting of a desired working position for a sensor.

In order to achieve these and/or other objects appearing from the present specification, claims and drawings, in the present invention there is the provision that on the sensor carrier gear tooth means are arranged which comply with the curvature of the arcuate guide and are engaged by a setting gear wheel rotatably mounted on the holding means such that the rotation of the gear wheel results in a shift of the holding means connected with the sensor along the arcuate guide.

It is in this manner that a change in the instantaneous working position of a sensor may be detected without any difficulty because the setting gear wheel is rotated. Rotation of the setting gear wheel causes it to move along the gear tooth means having an arcuate form and thereby entrain the holding means carrying the sensor with it. Owing to the drive transmission ratio present extremely exact adjustment is possible, which renders possible an accurate preset of the desired working position.

Further advantageous developments of the invention are defined in the claims.

The gear tooth means is conveniently arranged at one of the radial flanks of the arcuate guide and is more particularly designed in the form of a toothed ring.

It is preferable for the sensor carrier to be provided with a support wall set at a right angle to the longitudinal axis of the rotating shaft and in which an arcuate slot through which the holding means extends, is formed having the same center of curvature as the arcuate guide. Locking the sensor carrier in place may be simply performed by the provision on either side of the support wall of a holding part spanning the slot, such holding parts receiving between them the carrier wall parts adjoining the slot. The holding part arranged on the inner side of the support wall preferably bears the sensor, whereas on the outer holding part a setting portion is preferably arranged which is connected with the setting gear wheel part which is accessible from the outside in order to turn the respective setting gear wheel. For this purpose the setting portion preferably has an engagement portion for a turning tool, as for example a screw driver.

For the setting of the working position the gear wheel may be twisted in relation to the holding means, which for its part is slidingly mounted on the arcuate guide in such a manner as to prevent relative rotation. For locking in a working position once set, it is consequently sufficient to bring a rotation preventing part (which is connected with the holding means) into engagement with the setting gear wheel so that it is unnecessary to take additional steps for locking to the set working position.

Each respective sensor is preferably connected by means of a flexible connecting cable with a connection part, preferably designed in the form of a printed circuit board, which is fixed on the sensor carrier. On the connection part a connection means, constituted for example by a plug means, is then provided, which renders possible an electrical connection with an evaluating unit for processing the sensor's signals.

Further advantageous developments and convenient forms of the invention will be understood from the following detailed descriptive disclosure of one embodiment thereof in con on with the accompanying drawings.

LIST OF THE SEVERAL VIEWS OF THE FIGURES

DETAILED ACCOUNT OF THE WORKING EMBODIMENT OF THE INVENTION

Figure 1:
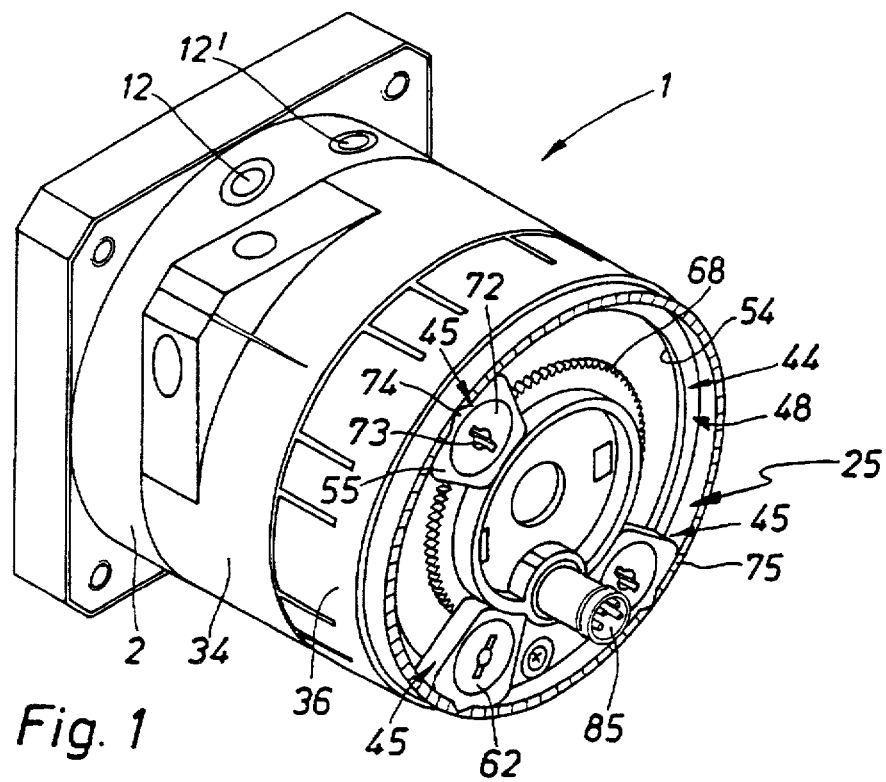
FIG. 1 shows a fluid power operated rotary drive in a perspective view fitted with a preferred design of the means of the invention.

The illustrated reference drive 1 possesses a drive housing 2 wherein a working space 3 is located.

A shaft 4 extending through the drive housing 2 is rotatably mounted in relation to the drive housing 2 by the intermediary of suitable bearing means 5, the axis of rotation coinciding with the longitudinal axis 6 thereof.

The shaft 4 also runs through the working space 3, where it cooperates with at least one drive means 7. The drive means shown by way of example is constituted by a so-called oscillating vane, which is connected with the shaft 4 in such a manner as to prevent relative rotation and sealingly divides up the working space 3, in cooperation with a partition 8 mounted in the working space 3, into two operation chambers. Each operation chamber communicates with an opening 12 and 12' provided exteriorly on the drive housing 2, via which a drive fluid, more particularly compressed air, may be supplied and let off in order to cause the drive means 7 to perform an oscillating movement, which is available at the shaft 4 as a rotary movement.

The shaft 4 has a drive output section 13 protruding through the front side of the drive housing 2 and adapted for connection with any desired component which is to be turned or pivoted.

The section of the shaft 4 projecting through the rear side of the drive housing 2 constitutes a control portion 14 which is provided with a setting means 15 for setting the maximum angle of rotation of the shaft 4. In the illustrated working embodiment this setting means comprises a pivoting abutment which is connected in such a manner as to prevent relative rotation with the shaft 4 and which has an abutment portion 17 arranged at a radial distance from the longitudinal axis 6, such portion 17 being provided for instance on a radially projecting pivoting abutment arm 18.

During operation of the rotary drive 1 the pivoting abutment 16 will perform a pivotal motion about the longitudinal axis 6 of the shaft 4, the abutment portion 17 moving along a circular arc. In the path of pivoting of the abutment portion 17 at least one and preferably two counter-abutments 22 are arranged, same being releaseably connected with the drive housing 2 and being able to be set in any desired positions along a circularly arcuate guide 23 in a releasable fashion. Each of the two counter-abutments 22 is active in one of the two possible directions of pivoting or oscillation of the pivotal abutment 16 so that by making the selected setting the terminal angular settings or the maximum angle of rotation of the shaft 4 connected with the pivoting abutment 16 may be preset.

Further details as regards the structure of the rotary drive illustrated by way of example, which owing to the design of the drive means 7 can be termed an oscillating vane motor, are to be found in the said German patent publication 3,941,255 C2, same being included herein by reference.

The control portion 14 extends axially past the pivoting abutment 16 and, on the side of the pivotal abutment 16 opposite to the drive housing 2, bears a device for detection or monitoring of the angular settings of the shaft 4, such means being referred to in the following as a detection means.

The actuating part 24 is mounted on the control portion 14 in such a manner as to prevent relative rotation, for which purpose it has a central recess 26 having a shaped or splined periphery for locking on the interlockingly shaped or splined part of the control portion 14. On a radially outwardly extending pivotal arm 27 on the actuating part 24 an actuating member 28 is provided forming part of the detection means 25, such member being for example constituted by a permanent magnet member. Since the actuating member 28 is arranged at a radial distance from the longitudinal axis 6, it will, when the shaft 4 is turning, perform a pivotal movement as indicated by the double arrow 23, along a circularly arcuate path of motion with a center located on the longitudinal axis 6.

The invention also contemplates dispensing with a separate actuating part 24 and providing the actuating part 28, for example at the abutment portion 17, on the pivotal abutment 16 in order in this fashion to ensure a reduction in the overall axial length of the rotary drive 1.

The setting means 15 is accommodated in a receiving space 33 delimited peripherally by a sleeve-like guard ring 34 open at each end thereof axially. This guard ring 34 is fixed in a releasable manner at the one end with a given angular alignment on the drive housing 2. Suitable alignment means 35 ensure an angularly correct fixation in position.

It is preferred for the control portion 14 to terminate within the receiving space 33, the actuating part 24 also assuming a position within the receiving space 33.

The outer side of the guard ring 34 axially opposite to the drive housing 2 is adjoined by a sensor carrier 36 forming part of the detection means 25. The latter is for example designed in the form of a cover delimiting the receiving space 33 on the side which is axially opposite to the drive housing 2. It preferably possesses a support wall 37 extending at a right angle to the longitudinal axis 6 and a tubular peripheral skirt 38 extending toward the drive housing 2, such skirt being arranged on the outer periphery of the support wall 37. First detent means 42 at the free end of the peripheral skirt are capable of releaseably connecting with second detent means 43 on the facing side of the guard ring in order to anchor the sensor carrier 36 on the guard ring. Furthermore, alignment means, not illustrated in detail here, are provided rendering possible attachment of the sensor carrier 36 on the guard ring 34 in only one preset angular alignment position and furthermore ensuring that the sensor carrier 36 is prevented from rotating in relation to the drive housing 2.

The detection means 35 furthermore possesses a circularly arcuate guide 44 bearing, by means of a respective holding means 45, a plurality of sensors 46 so that the sensors 46 may be longitudinally adjusted in relation to the sensor carrier 36, that is to say adjusted in the longitudinal direction of tithe arcuate guide 44.

The sensors 46, which in the present embodiment of the invention are magnetoresistive sensors or, preferably, so-called reed switches, are so placed that same are located to the side of the path of movement of the actuating member 28 with an axial spacing therefrom as measured in the direction of the longitudinal axis 6. As soon as the actuating member 28, owing to the rotary movement of the shaft 4, assumes a position at a sensor 46, same will be actuated with the production of a sensor signal corresponding to a certain angular position of the shaft 4. The sensor signal is for example fed to an electronic evaluating means 47, in which signal processing takes place, for example in such a manner that in a way dependent on certain signals certain control functions are caused to take place.

In the individual figures a different number of sensors 46 is illustrated in order to make it clear that the detection means 25 may be provided with practically any desired number of sensors 46, which operate independently of one another.

In the illustrated working embodiment the arcuate guide has a respective circularly arcuately curved guide track 48 and 48' provided on the inner side, facing the actuating member 28, and on the axially oppositely directed outer side of the support wall 37. The tracks 48 and 48' are in the present working example of the invention formed by groove-like recesses and comprise a base face 52, which extends at a right angle to the longitudinal axis 6, and two cylindrical guide faces 53 delimiting the base face 52 radially to the outside and radially to the inside. The ring-like guide tracks 48 and 48' formed in this manner have the same diameter, an arcuate slot 54 being provided at the base faces 52 extending axially through the support wall 37, such slot connecting the two guide tracks 48 and 48' together and dividing the base faces 52 into two sections 58 flanking the slot 54.

Each holding means 45 comprises an outer and an inner holding portion 55 and 56 so interlockingly arranged in the associated outer and, respectively, inner guide track 48 and 48' that same may only be moved in the longitudinal direction of the guide tracks 48 and 48'. More particularly this prevents twisting of the holding portions 55 and 56 about an axis parallel to the longitudinal axis 6 in relation to the sensor carrier 36. This is achieved in the illustrated working embodiment because on at least one and both two counter-guide faces facing the respective guide face 53 each respective holding portion 55 and 56 has a curvature which is complementary to the associated guide face 53.

The two holding portions 55 and 56 of each respective holding means 45 radially span the arcuate slot 54 and bear against the two longitudinal sides of the slot 54 on edge sections 58, associated with it, of the base face 52.

The holding portions 55 and 56 are held together by the intermediary of a connecting member 62 extending through the slot 54 and locked in the respective guide track 48 and 48'. The connecting member 62 illustrated by way of example is designed in a manner similar to a bolt and has a head 63 counter sunk in the outer holding portion 55 and an adjoining shank 64, which is preferably secured by a detent connection to the inner holding portion 56.

The above mentioned sensor 46 is secured to the inner holding portion 56. In the illustrated working embodiment the inner holding portion 56 designed in the form of a housing, wherein the sensor 46 is accommodated and protected. It is preferably located on a printed circuit board 65 secured in the housing.

On each a holding means 45 a rotatably mounted setting gear wheel 66 is provided, the axis of the rotation 67 extending in parallelism to the longitudinal axis 6 of the shaft 4. These setting gear wheels 66 are in mesh with a gear tooth means 68 following the curvature of the arcuate guide 44 and formed on the sensor carrier 36.

It is preferred for the gear tooth means 68 to be arranged at one of the two radial flanks of the arcuate guide 44. In the illustrated working embodiment the tooth means is located at the radially inner flank, the oppositely placed flank being without gear teeth. The length of the gear tooth means 68 is generally the same as the length of the arcuate guide 44, which in the present embodiment of the invention extends over a center angle of somewhat less than 360° and is for example approximately 270°. Accordingly the gear tooth means 68 also generally forms a circle and has the form of a gear ring.

In the illustrated working embodiment the gear tooth means 68 is formed directly on the one (in the present case radially inner) flank of the arcuate slot 54. The associated setting gear wheel 66 extends into the slot 54, it engaging the inner slot flank with the gear tooth means 68, whereas it does not cooperate with the outer slot flank, which is free of teeth.

It is preferred for the setting gear wheel 66 and the connecting member 62 to constitute a single sub-assembly. In the embodiment of the invention the gear wheel 66 is constituted by a gear ring formed on the external periphery of the connecting member 62 between the head 63 and the shank 64. The connecting member 62 itself is rotatably mounted in the two holding portions 55 and 56.

The head of the connecting member 62 constitutes a setting portion 72, on which an engagement portion 73 is provided for a rotary or screwing tool. The engagement portion in the example is slot-like and permits the introduction of a screw driver. It is accessible without any trouble from the axial external side, opposite to the drive housing 2, of the sensor carrier 36.

In order to bring a sensor 46 into its intended working position at the movement track of the actuating member 28, the connecting member 62 is turned by means of a screw driver or wrench about its longitudinal axis 67, this causing rotation of the setting gear wheel 66, which means that the setting gear wheel 66 runs in the one or the other direction along the gear tooth means 68. Since the holding means 65 is arranged in the arcuate guide 44 in such a manner as to prevent its rotation, there will be a shift of the holding means 65 in the longitudinal direction along of the arcuate guide 44 jointly with the sensor 46 arranged thereon. Since the pitch circle diameter of the setting gear wheel 66 is substantially smaller than that of the gear tooth means 68, there is a substantial step-down transmission ratio rendering possible an extremely accurate adjustment of the sensor 46.

Positioning may be facilitated if the outer holding portion 55 at the outer side of the support wall 37 has a radially directed pointer 74 thereon, which cooperates with an angle scale 75 provided on the sensor carrier 36 and makes it possible to take readings for the respective setting.

Figure 3:
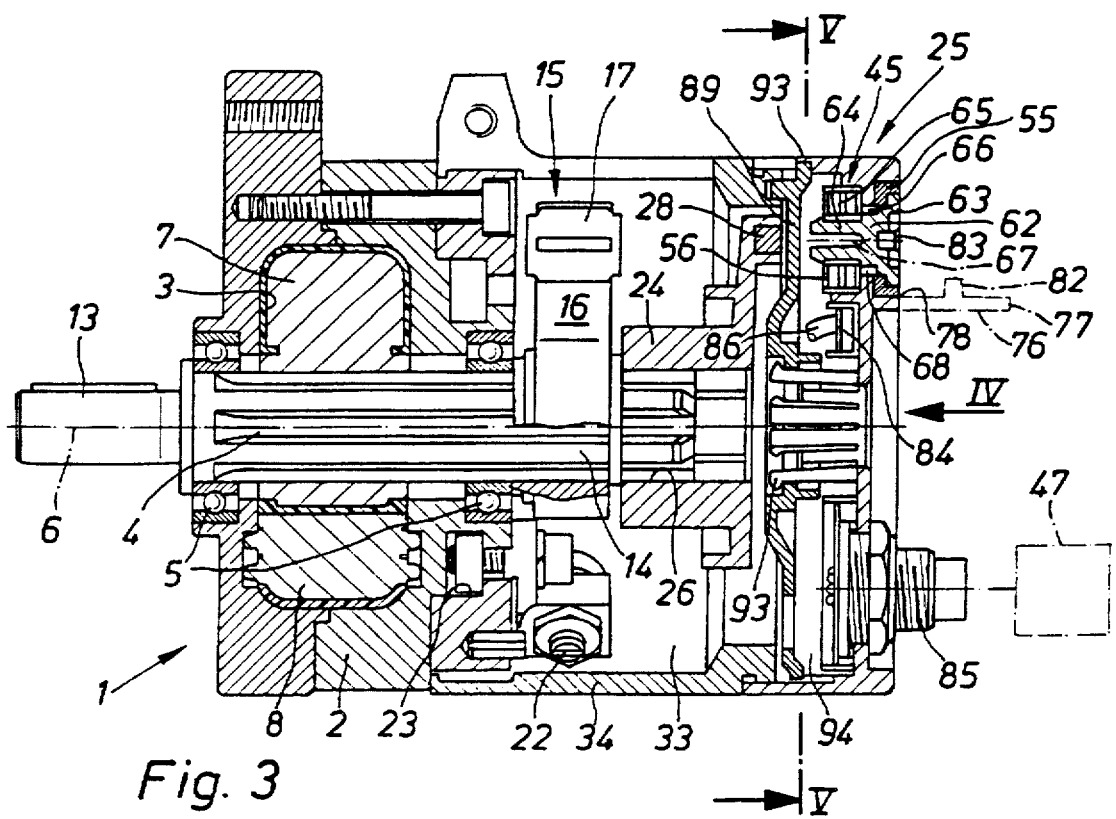
FIG. 3 shows the rotary drive of FIGS. 1 and 3 in a longitudinal section.
Figure 2:
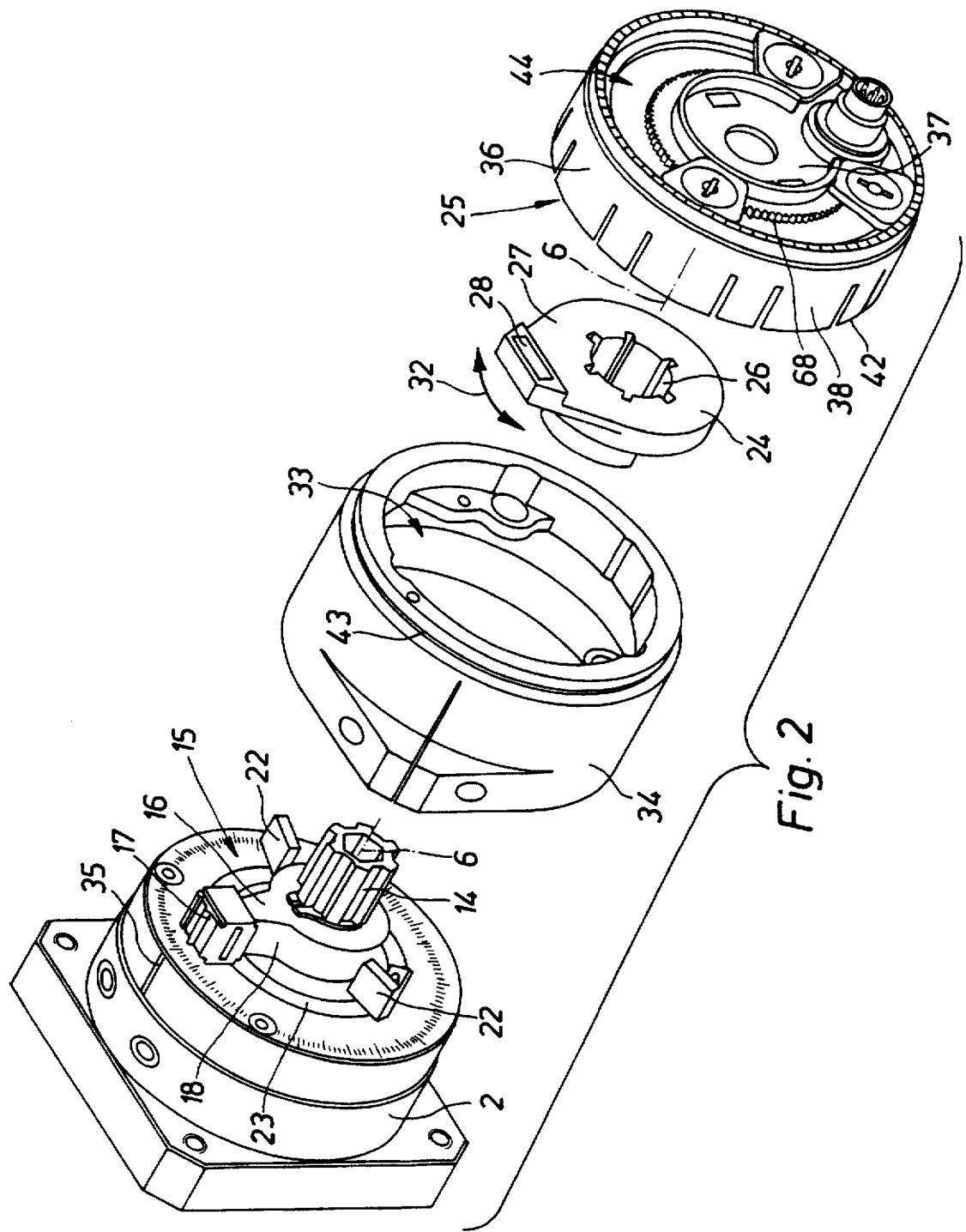
FIG. 2 illustrates the rotary drive of FIG. 1 in a perspective, exploded view.
Figure 4:
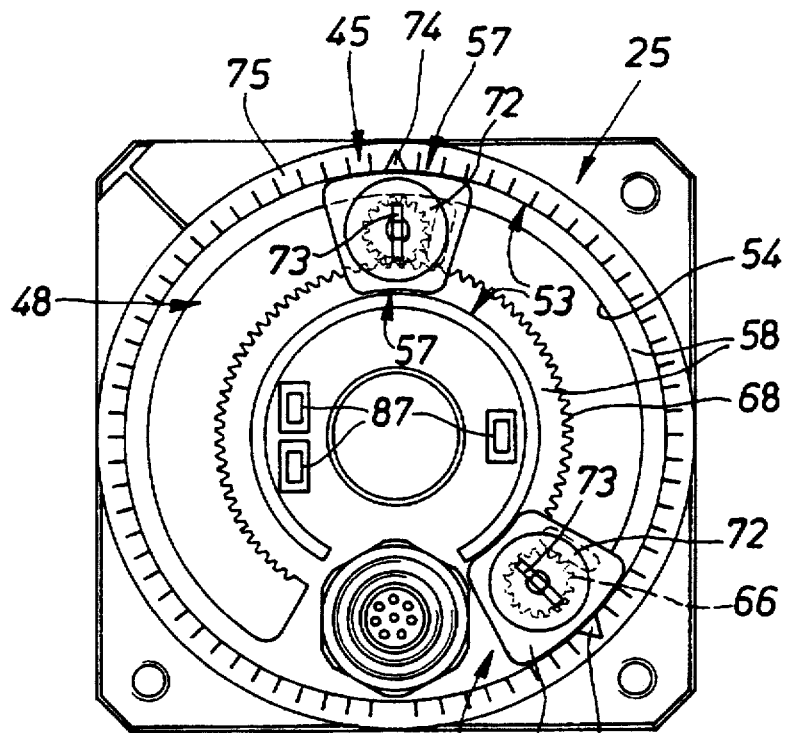
FIG. 4 is a rear view of the rotary drive looking as indicated by the arrow IV of FIG. 3 toward the outer side of the sensor carrier.
Figure 5:
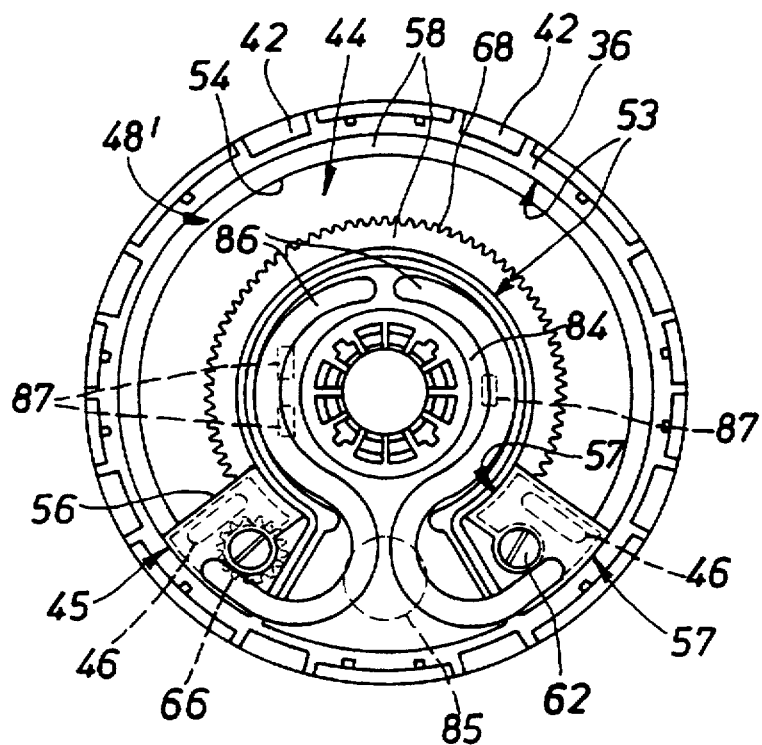
FIG. 5 is a view of the sensor carrier as seen from the inside and generally in accordance with the section line.
Figure 6:
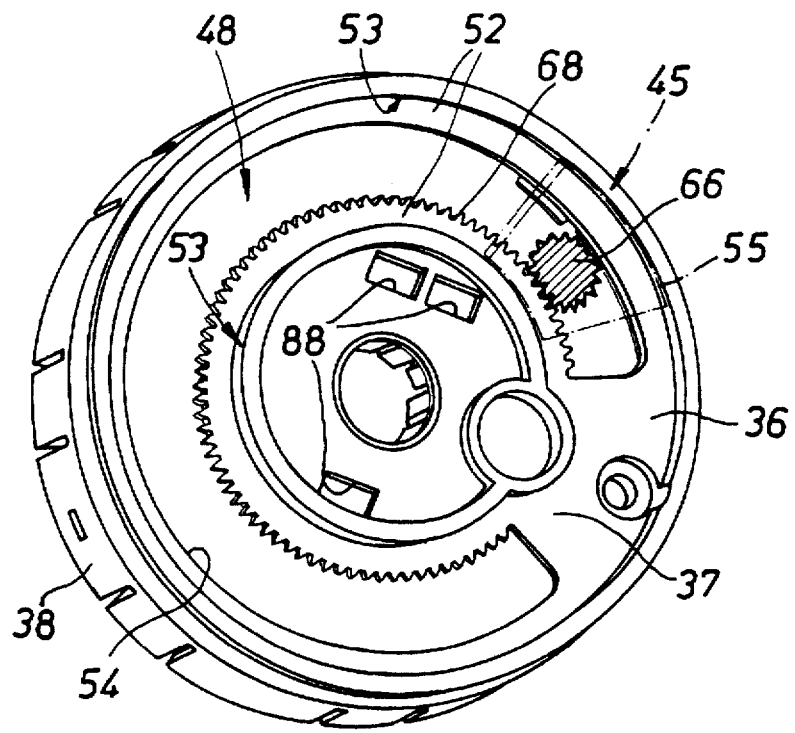
FIG. 6 is a separate view of the sensor carrier looking toward the outer side, a setting gear wheel and the external holding part of an associated holding means being indicated by way of amplification.
Figure 7:
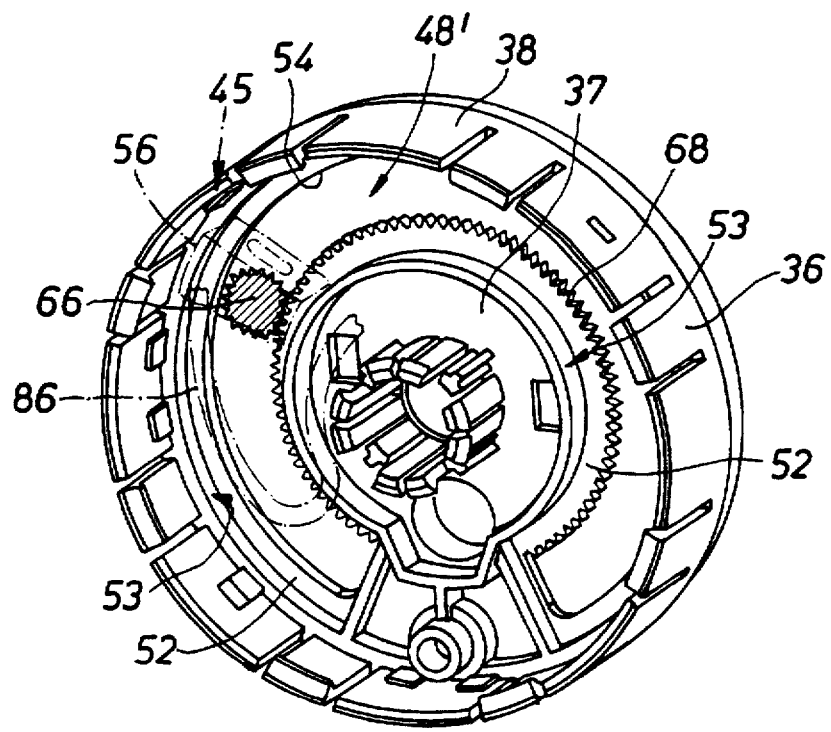
FIG. 7 is a separate view of the sensor carrier as seen from the inside, the gear wheel and the internal holding part of the holding means including the electrical connecting cable leading to same again being indicated.

The set working position of a sensor 46 may be locked without any difficulty if a twist-lock part 76 is provided as indicated in broken lines in FIG. 3, with which accidental twisting of the setting gear wheel 66 in relation to the holding means 45 may be precluded. The twist-lock part 76 provided by way of example is constituted by a pivotal lug 77, molded on the outer holding portion 55 with a film hinge 78. In the locked setting, not illustrated, the pivotal lug 77 is pivoted using the setting portion 72 so that a locking portion 82 comes into untwistable engagement with the setting portion 72, preferably by fitting interlockingly in a central locking recess 83 in the setting portion 72 which is toothed or splined.

It is in this manner that additional attachment means for frictionally locking the holding means 45 are rendered unnecessary. The setting operation can be performed extremely rapidly and there is no danger of the position once set being lost again when an additional attachment means is tightened up.

In order to provide the electrical connection between the sensors 46 and the above mentioned evaluating means 47 a connection part 84, for instance in the form of a printed circuit board, is provided on the sensor carrier 36. Such connection part 84 is fixed concentrically radially within the guide track 48 on the inner side of the support wall 37. A connection means 85 attached to the connection part 84 and preferably in the form of a plug means, renders possible connection with the above mentioned evaluating means 47.

The connection between a respective sensor 46 and the connection part 84 is ensured by a flexible electric linking cable 86. Such cable is of adequate length so that it may readily keep up with the movements of the sensor 46 when the working position is changed. Display elements 87, preferably in the form of LED's, provided on the connection cable 84 in the connection between the linking cable 86 and the connection means 85 render possible a display of the state of switching of the sensors, which may be easily seen from the outside. In the support wall 37 suitable recesses 88 are provided so that the display elements 87 are visible from the outside.

In order to prevent contact between the linking cable 86 land the rotating actuating part 24, an additional partition 89 is mounted in the sensor carrier 36 at an axial distance from the support wall 37. It is preferably fixed in place by detent catch means 93. Jointly with the support wall 37 and the section, placed between it and the support wall 37, of the peripheral wall 38 it delimits a guard space 94, in which the linking cable 86 and furthermore the inner holding portions 56 including the sensors 46 are housed. The actuating part 24 is located beyond the partition 89 outside the guard space 94.

We claim:

1. A device for detecting the angular position of a shaft able to be driven about its longitudinal axis, comprising an actuating member connected with the shaft, in such a manner as to prevent relative rotation, at a radial distance from said longitudinal axis and at least one sensor for responding to the actuating member, said sensor being arranged by means of a holding member in such a longitudinally adjustable fashion on a circularly arcuate guide forming part of a sensor carrier which is stationary in relation to the shaft when rotating that the sensor may be positioned in different working positions along the arcuate track of movement defined by the actuating member, wherein on the sensor carrier gear tooth means are arranged which comply with the curvature of the circularly arcuate guide and are engaged by a setting gear wheel rotatably mounted on the holding means such that the rotation of the gear wheel results in a shift of the holding means connected with the sensor along the circularly arcuate guide.

2. The device as claimed in claim 1, wherein the gear tooth means is arranged at one of the two radial flanks of the circularly arcuate guide.

3. The device as claimed in claim 1, wherein the circularly arcuate guide constitutes at least part of circle, the gear tooth means being similar to a gear ring.

4. The device as claimed in claim 1, wherein the circularly arcuate guide has a curved slot formed in a support wall, maligned at a right angle to the longitudinal axis of the shaft, of the sensor carrier.

5. The device as claimed in claim 4, wherein the gear tooth means is provided on one of the two slot flanks and preferably on the radially inner slot flank, the setting gear wheel in mesh with the gear tooth means extending into the slot.

6. The device as claimed in claim 4, wherein such a sensor is locked on a holding portion of the holding means located at the inner side, facing the actuating member, of the support wall.

7. The device as claimed in claim 6, wherein the holding portion is designed in the form of a housing accommodating the sensor.

8. The device as claimed in claim 6, wherein such a sensor is connected by means of a flexible linking cable with a connection part locked on the sensor carrier, such connection part being for its part able to be connected with an electronic evaluating means via a connection means.

9. The device as claimed in claim 8, further comprising a partition between the actuating member and the support wall, such partition cooperating with the support wall in delimiting a guard space for the linking cables present.

10. The device as claimed in claim 4, wherein the holding means comprises at least one holding portion arranged on one of the two sides of the support wall and spanning the arcuate slot in the manner of a bridge, it furthermore bearing against the two longitudinal sides of the slot and being supported for sliding motion on curved guide faces of the circularly arcuate guide.

11. The device as claimed in claim 10, wherein the holding means comprises two holding portions arranged on the two sides of the support wall and connected together by a connecting member extending through the slot, the setting gear wheel, preferably in the form of a gear ring, being formed on such connection member.

12. The device as claimed in claim 10, wherein the holding portion arranged on the outer side of the support wall has a pointer for cooperation with a scale provided on the sensor carrier for visual display of the working position.

13. The device as claimed in claim 1, wherein the setting gear wheel is connected with a setting portion accessible from the outer side, opposite to the actuating member, of the sensor carrier, such setting portion preferably having an engagement portion for a rotary tool such as a screw driver.

14. The device as claimed in claim 1, wherein the sensor carrier constitutes a cover delimiting the receiving space for the actuating member.

15. The device as claimed in claim 1, wherein the actuating member is constituted by a permanent magnet, the sensors present if required being constituted by magnetoresistive sensors and/or reed switches.

16. The device as claimed in claim 1, wherein the shaft is constituted by the driven shaft of a fluid power operated rotary drive.

17. The device as claimed in claim 16, wherein the rotary drive is designed in the form of an oscillating vane drive.

18. The device as claimed in claim 16, furthermore comprising a setting means for a variable preset of the maximum angle of rotation of the shaft, the settings thereof being able to be made independently of the settings of the working positions of the at least one sensor and which is preferably arranged axially between the sensor carrier and the drive housing of the rotary drive.

19. The device as claimed in claim 18, wherein the actuating member is provided on a pivotal arm connected with the shaft in such a manner as to prevent relative rotation.

20. The device as claimed in claim 1, comprising a twist-lock part arranged on the holding means for locking the set working position, such twist-lock part cooperating with the setting gear wheel.

* * * * *